INVENTOR.
DIONYSIOS D. PAPADATOS
RAYMOND A. DEIBEL and
BY WILLIAM C. RIESTER

ATTORNEY.

INVENTOR.
DIONYSIOS D. PAPADATOS
BY RAYMOND A. DEIBEL and
WILLIAM C. RIESTER

E. Herbert Liss
ATTORNEY.

INVENTOR.
DIONYSIOS D. PAPADATOS,
RAYMOND A. DEIBEL and
WILLIAM C. RIESTER.
BY
E. Herbert Liss
ATTORNEY.

United States Patent Office 3,619,847
Patented Nov. 16, 1971

3,619,847
CONCEALED WINDSHIELD WIPER SYSTEM
Dionysios D. Papadatos, Kenmore, Raymond A. Deibel, West Falls, and William C. Riester, Williamsville, N.Y., assignors to Trico Products Corporation, Buffalo, N.Y.
Filed Feb. 19, 1970, Ser. No. 12,627
Int. Cl. A47l 1/00; B60s 1/02
U.S. Cl. 15—250.16                                    12 Claims

ABSTRACT OF THE DISCLOSURE

A motor vehicle includes a transversely extending hinged cowl panel adjacent the lower edge of the windshield for concealing therebelow the windshield wiper arms and blades when parked. The hinged cover or cowl panel is movable from a closed position when the wipers are parked to an open position when the wipers are operating. A fluid pressure windshield wiper motor oscillates the wiper arms and blades through a linkage transmission. The motor includes an auxiliary linearly reciprocating drive shaft for moving the cowl to open position when the wiper motor is started before the arms and blades move out of parked position and to closed position when the wiper motor is switched off following movement of the wiper arms and blades to a depressed park position. The linearly reciprocating drive shaft is coupled to the hinged cowl panel through a releasable coupling assembly which can be uncoupled to permit manual movement of the cowl panel to an extreme open detent position for access to the equipment stowed therebelow. The coupling assembly is provided with an intermediate detent position for returning the cowl to a position to permit wiper operation in case of failure of the cowl retracting mechanism.

BACKGROUND OF THE INVENTION

The invention relates to apparatus for concealing retractable mechanisms and particularly to improved apparatus for concealing windshield cleaning mechanisms when not in use.

Heretofore complex linkage and gearing systems have been developed for actuating a cover panel for an access opening to conceal apparatus which is movable from a concealed inoperative position beneath a hinged cover panel to an external operative position. Proper sequential operation to assure coordinated movement of the cover panel with respect to the movable apparatus has been accomplished through linkage mechanism connecting the driving means with the cover panel.

For many applications it is essential to retain the cover panel securely in an open or closed position and it is desirable to provide for manual manipulation for repair or replacement of expendable parts of the operating apparatus. This is particularly true for example in concealed windshield cleaning mechanisms for motor vehicles which are stowed beneath a cover panel formed by a hinged cowl panel. It would be unsafe and distracting to the operator to have the cowl panel flapping or vibrating while the car is in motion. In such an application it is advantageous to provide means for securely retaining the cowl panel in open or closed position as well as for readily releasing the cowl panel to permit manual opening thereof for replacement of wiper blades and wiper arms.

The complex linkage and gearing systems which have been provided preclude achievement of both stability and ready releasability. In other systems spring hinges employing heavy overcenter springs are provided to effect stability. In some known systems separate motors are provided for operating the cover panel and for driving the apparatus. The use of heavy over-center springs requires a large motor to actuate and results in noisy operation. The use of a separate motor for operating the cover panels increases the cost.

SUMMARY OF THE INVENTION

The novel apparatus of the present invention utilizes a single fluid motor to actuate the concealed apparatus and the hinged cover panel. It comprises a motor having main operating output shaft which, through a linkage transmission, operates the wipers to and fro across an overlapping arcuate path on the windshield. The motor is also equipped with an auxiliary linearly reciprocating output shaft which operates through a simplified coupling mechanism to drive the cowl panel to an open position when the motor is switched on but before the wipers move to their operative position. The auxiliary output shaft remains in this position holding the cowl stable while the wipers are operating. When the motor is switched off the wipers are driven to a depressed parked position and subsequently the auxiliary shaft moves the cowl panel to a closed position and positively retains it in the closed position. The coupling mechanism comprises a drive lever releasably latched to a keeper element through a manually actuatable latching element. When the latching element is actuated the cowl panel can be manually moved to an extreme open detent position for repair and replacement of parts of the concealed apparatus and can also be manually opened to an intermediate detent position so that the cowl panel can be retained in suitable operative position if for any reason the motorized operation fails. Camming means are also provided on the keeper to permit the cowl panel to be closed manually.

The principal object of the present invention is to provide improved apparatus for concealing retractable mechanisms which is simple and permits either motorized or manual operation.

Another object of the invention is to provide improved apparatus for concealing retractable mechanisms which utilizes a single motor both for actuating a cover panel and for operating the concealed mechanism.

Other objects and advantages of the invention will be apparent from the following detailed description taken in connection with the accompanying drawings.

DESCRIPTION OF THE PREFERRED EMBODIMENT

Figure 1:
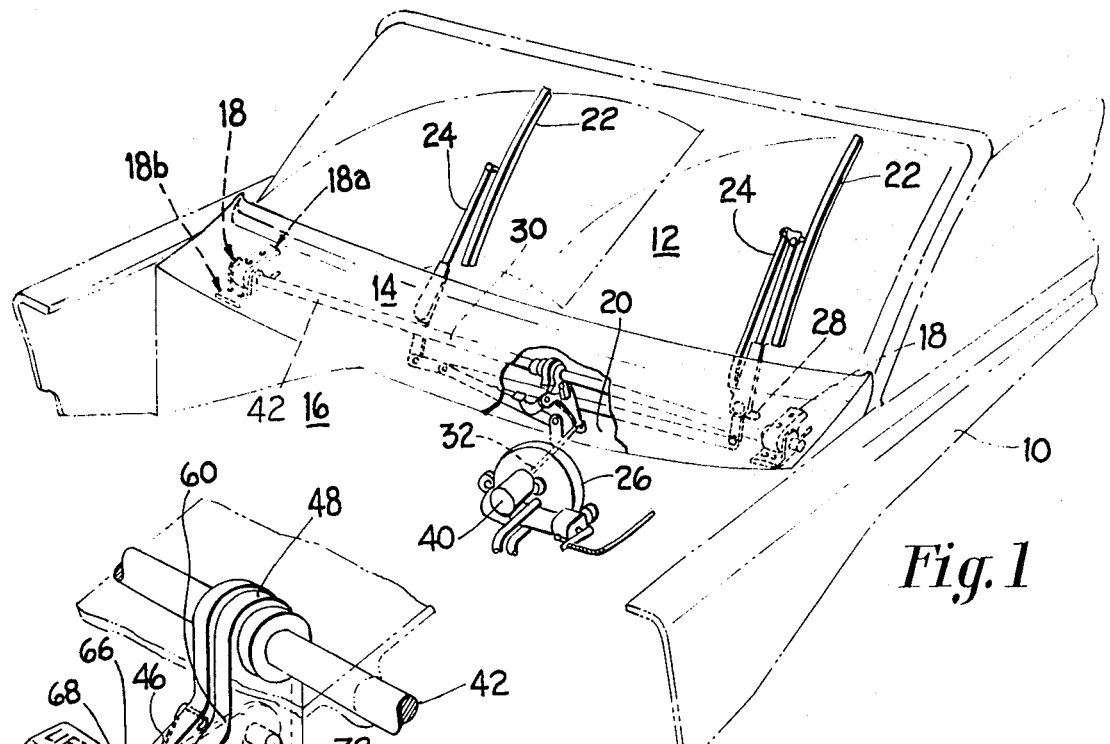
FIG. 1 is a partial perspective view of a motor vehicle incorporating the invention.

Referring to FIG. 1, a portion of a vehicle 10 is shown having a windshield 12. The vehicle includes a cowl panel 14 extending forwardly from the windshield 12. The cowl panel 14 is hinged to firewall 16 by means of a pair of spaced apart hinges 18. The hinges 18 include a movable hinge leaf 18a secured to the cowl panel 14 and a stationary hinge leaf 18b secured to a body section. The lower edge of the windshield 12 extends beyond the cowl panel 14 to provide for storage of the windshield wiper mechanism in a concealed position between a horizontal surface 20 of the firewall and the cowl panel 14. A windshield cleaning mechanism comprises a pair of wiper blades 22 carried by wiper arms 24. The wiper arms have spring hinge connected mounting heads (not shown) such that the blades 22 are maintained in engagement with the windshield 12 under pressure. The wiper blades 22 are movable throughout their running strokes across the outer surface of the windshield 12 and are movable from the end of their running stroke position to a depressed parked position beyond their running range below the cowl panel 14 when not in use.

The wiper blade and arm assemblies are oscillated conjointly by a fluid pressure wiper motor 26 suitably attached to the firewall of the vehicle. The motor 26 includes an oscillating output shaft 27 coupled through a linkage assembly 30 to a pair of spaced apart pivot shafts 28 suitably journaled in the firewall 16 adjacent the lower edge of the windshield. The pivot shafts 28 carry the wiper arm mounting heads. An auxiliary linearly reciprocating output shaft 32 of the motor 26 is pivotally secured at its end to the free end of an elongate drive lever 34 of a coupling assembly 36 by a clevis 38.

Figure 2:
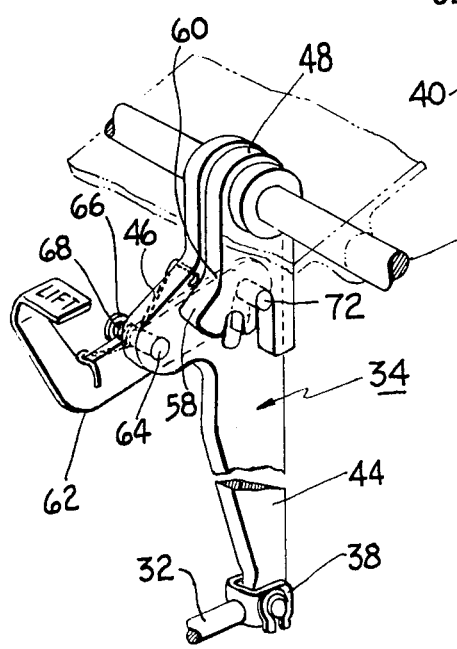
FIG. 2 is a perspective view of the latch mechanism of the present invention in closed position.
Figure 3:
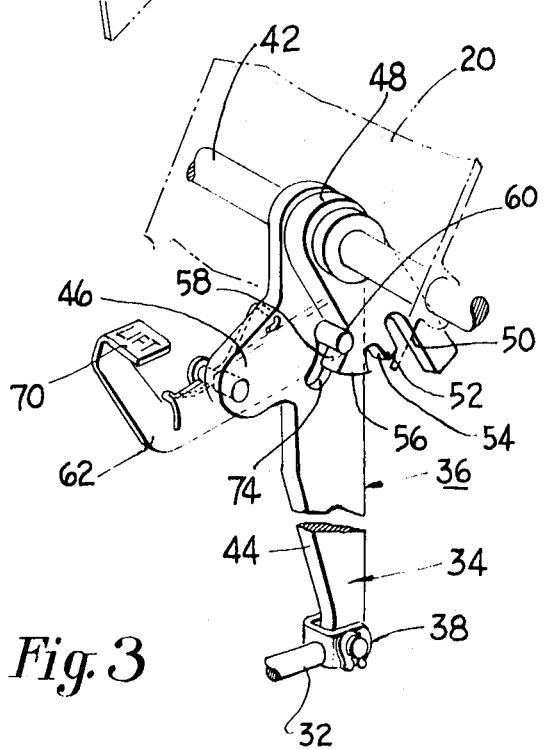
FIG. 3 is a perspective view similar to FIG. 2 with the cowl panel in open position.

A torsion bar or rod 42 extends between the hinges 18 and is pivotally mounted at its ends to stationary hinge leaf 18b. Movable hinge leaf 18a is fixed to the rod 42 for movement therewith. Thus rod 42 forms a pivotal axis for cowl panel 14. The coupling assembly 36 is mounted on the rod intermediate the hinges 18 and adjacent the motor 26. The drive lever 34 extends radially from the torsion bar 42 and is secured thereto for pivotal movement about the axis of torsion bar 42. It includes an elongate arm 44 to which the clevis 38 is pivotally secured adjacent the free end thereof. A shorter arm 46 extends laterally from the arm 44 adjacent the end of the arm 44 which is mounted on the torsion bar 42. In side-by-side relationship, closely adjacent the drive lever 34, a keeper 48 is rigidly secured to the shaft 42 and is rotatable therewith. Keeper 48 includes a slot 50 and a cam surface 52 extending therefrom. The cam surface includes a notch or first detent position 54 and a first ramp 56 extending from the notch 54 to a second ramp 58 which terminates in a depression 60. A manually actuated latch lever 62 is pivoted intermediate its ends on a transverse axis 64 adjacent the end of arm 46 of drive lever 34. The axis 64 is formed by a headed pivot pin 66 which extends laterally outwardly from the drive lever 34 and receives intermediate its headed end the drive lever 34 of torsion spring 68. The torsion spring 68 has one end bearing against the upper surface of manually actuated latch lever 62 and its other end bearing on arm 46 of drive lever 34. The manually actuated lever 62 thus tends to rotate counterclockwise about its axis 64 as seen in FIGS. 2 and 3. At one end the latch lever 62 has formed thereon a finger tab 70 and at its other end a laterally extending pin 72. The laterally extending pin 72 extends through an arcuate slot 74 in drive lever 34; the arcuate slot is concentric with axis 64. When the pin 72 is aligned with notch 50 of keeper 48 the drive lever and rod 42 together with movable hinge leaves 18a and cowl panel 14 are coupled for movement about the axis of rod 42. The pin 72 is biased by the torsion spring 68 to engage notch 50 when it is in alignment therewith. When the pin 72 is out of alignment with notch 50 the pin is biased against the cam surface 52 and as the pin moves along the cam surface 52 it is biased into engagement with the notch 54 to hold the cowl panel in an operating position or into engagement with depression 60 to retain the cowl panel 14 in a fully open position for access to the windshield cleaning mechanism. The latch lever 62 can be manually actuated in a clockwise direction about axis 64 against the bias of torsion spring 68. Under normal operating circumstances, however, the pin 72 is engaged in notch 50 of keeper 48.

The motor 26 may be of the type shown and described in greater detail in application Ser. No. 12,626 by Anthony R. D'Alba, filed Feb. 19, 1970 and assigned to the assignee of the present invention.

Figure 4:
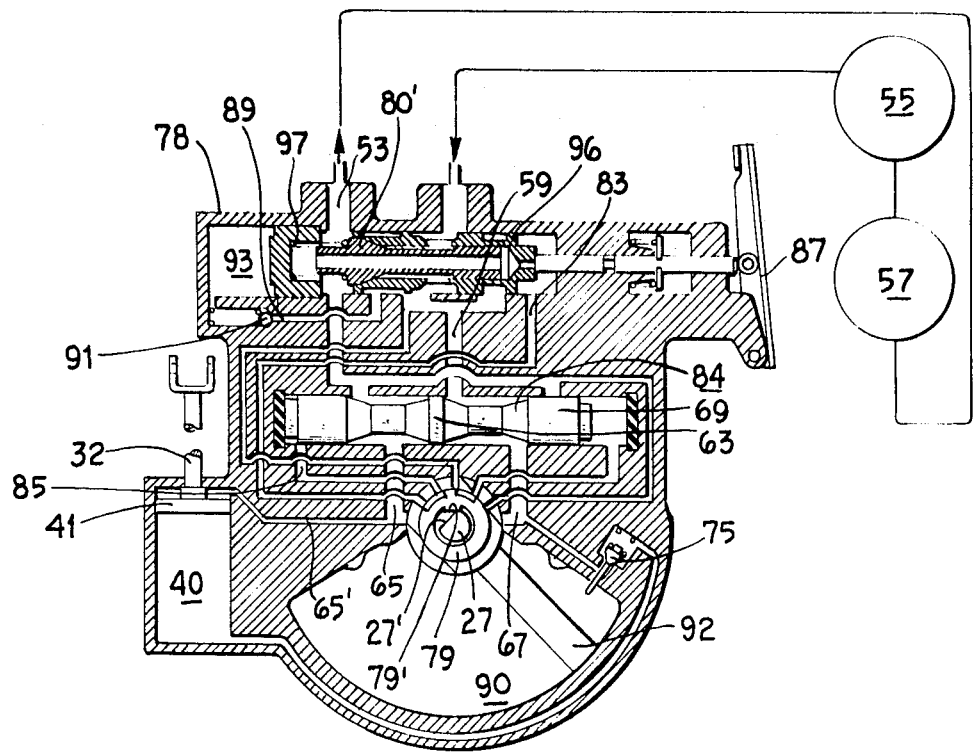
FIG. 4 is a schematic diagram of a motor suitable for use in the invention the motor being illustrated running in a clockwise direction.
Figure 5:
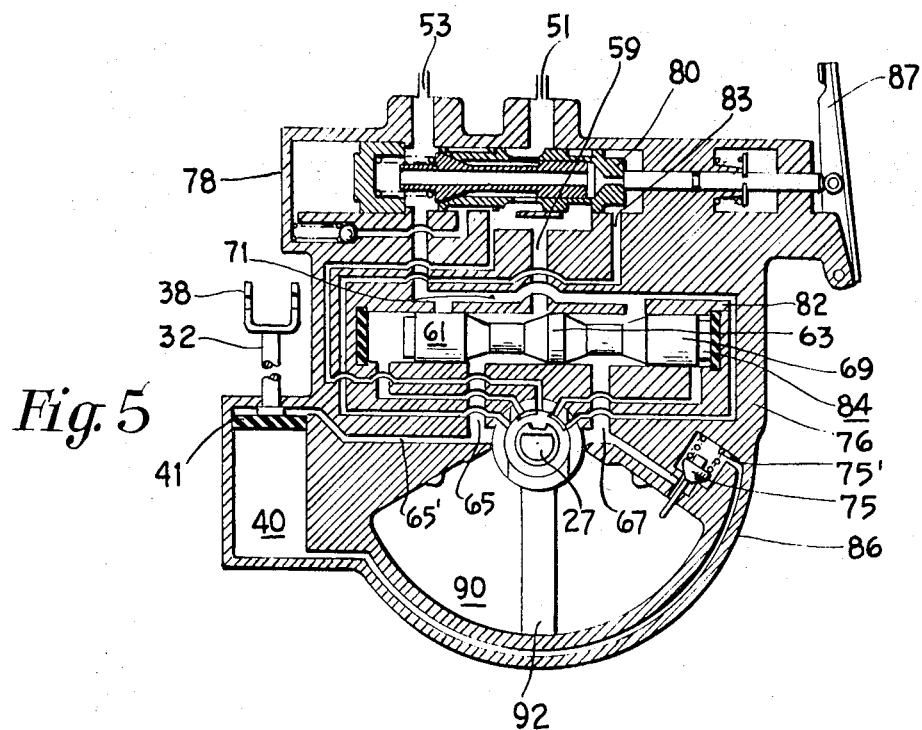
FIG. 5 is a schematic diagram of a motor similar to FIG. 4, the motor being illustrated running in a counter-clockwise direction.
Figure 6:
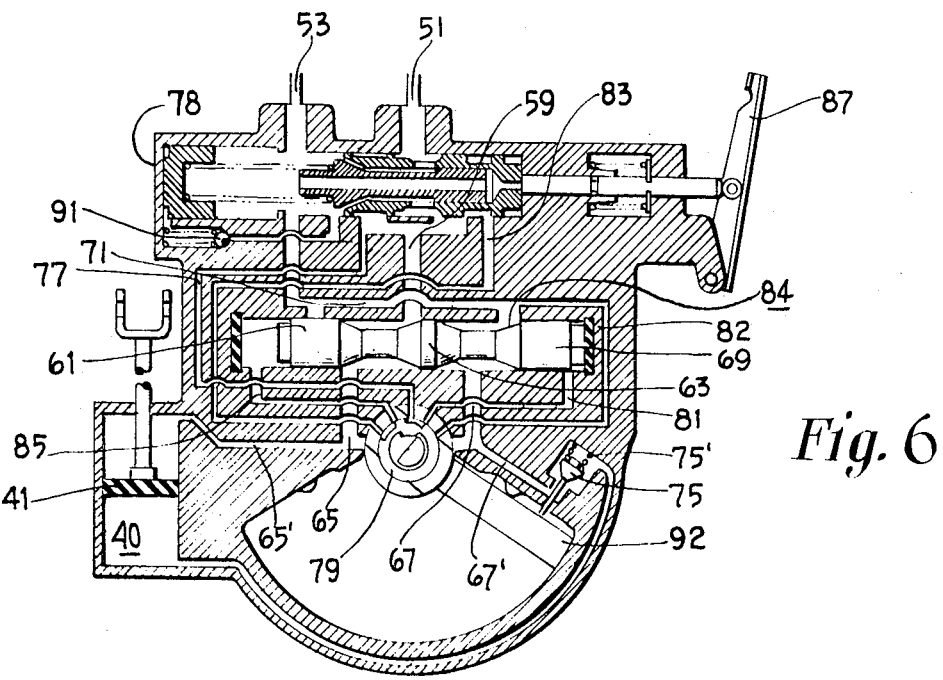
FIG. 6 is a schematic diagram of a motor similar to FIGS. 4 and 5, the motor being illustrated in a parked position.

The motor 26, illustrated diagrammatically in FIGS. 4, 5 and 6, is a fluid pressure type motor comprising a housing 76 having a control valve housing section 78 in which a control valve assembly 80 is slideably received, a reversal valve housing section 82 in which a shuttle type reversal valve 84 is slidably received and a motor piston housing section 86. The motor piston housing section 86 includes a main piston chamber 90 and an auxiliary piston chamber or cylinder 40. A vane type primary piston 92 oscillates in an arcuate path in the main chamber 90 and a linearly reciprocating secondary piston 41 is disposed in the auxiliary chamber 40. The primary piston 92 is secured to oscillating output shaft 27. Output shaft 27 is coupled through a linkage assembly 30 to a pair of spaced apart pivot shafts 28 suitably journaled in the firewall 16 adjacent the lower edge of the windshield. The pivot shafts carry the wiper arms 24. Secured to the secondary piston 41 is a shaft 32 having a clevis 38 which is pivotally secured to the free end of elongate drive lever 34 of coupling assembly 36. The motor housing includes an inlet port 51 and a discharge or exhaust port 53.

When the motor is in parked position shown in FIG. 6 pump 55 draws fluid from a source or reservoir 57 (FIG. 4) through inlet 51. The fluid circulates through control valve housing 78 through control valve assembly 80 to discharge port 53 and returns to reservoir 57. It also flows through a duct 59 and reversal valve housing section 82 between lands 61 and 63 of reversal valve 84 and thence through duct 65 to the left side of piston 92 as seen in FIGS. 4, 5 and 6. Pressurized fluid also flows through a branch conduit 65' to the upper side of piston 41 in auxiliary chamber 40. Fluid is exhausted from the right side of piston 92 through a duct 67 to reversal valve housing section 82 between lands 63 and 69 of reversal valve 84 and thence through a duct 71 through control housing section 78 to discharge port 53. At the same time fluid is exhausted from the lower side of piston 41 in auxiliary chamber 40 through a conduit 73, sequence valve 75 and conduit 67' which joins conduit 67. Thus the piston 92 is retained in its parked position beyond the running range, maintaining normally closed sequence valve 75 in an open position. Sequence valve 75 is normally biased to closed position by spring 75'. Piston 41 and shaft 32 are retracted, thereby retaining the cowl panel 14 closed. Pressurized fluid also flows from the inlet 51 through control valve housing section 78 and to conduits 77 and through pilot valve 79, then through conduit 81 to the right side of reversal valve 84. The pressurized fluid further flows through conduit 83, pilot valve 79 and conduit 85 to the left side of reversal valve 82, thus balancing reversal valve 82 to maintain it in the position shown in FIG. 6.

When the lever 87 is manipulated through a manual control (not shown) to the position shown in FIG. 4, the control valve assembly moves to the position seen in FIG. 4 and fluid flows through the control valve housing section 78, the conduit 89 and through ball check valve 91 to chamber 93, moving pressure regulating piston 95, against the force of spring 97. This causes bypass valve 80' of control valve assembly 80 to close, thereby increasing inlet pressure. Furthermore, conduit 83 opens to exhaust port 53 through the control valve assembly 80 and the chamber to the right of land 96, thus the pressure on the left side of reversal valve 84 drops to exhaust value near zero and the reversal valve shifts to the position seen in FIG. 4 whereby duct 67 now communicates with inlet port 51 through reversal valve housing section 82 between lands 63 and 69 and through duct 59 permitting pressurized fluid to flow to the right side of piston 92 and through sequence valve 75 and conduit 73 to auxiliary chamber 40 at the lower side of secondary piston 41. Duct 65 now communicates with the exhaust port 53 exhausting chamber 90 to the left of piston 92 and through conduit 65' exhausting the portion of auxiliary chamber 40 above piston 41, thus moving the piston 41 and shaft 32 to an extended position, opening cowl panel 14. The piston 92 then moves clockwise. When it leaves its depressed parked position it permits sequence valve 75 to move to its normally biased closed position. Pressurized fluid is now trapped between piston 41 and sequence valve 75 to thereby retain the shaft 32 in its extended position until the piston 43 again returns to its parked position causing sequence valve 75 to open.

The piston 92 will continue to move clockwise until the flat portion 27' of shaft 27 engages tooth 79' of pilot valve 79 shifting the pilot valve 79 to the position seen in FIG. 5.

When the pilot valve shifts to the position seen in FIG. 5 the pressurized fluid and exhaust fluid are redirected to cause reversal valve 84 to move to the position seen in FIGS. 5 and 6, thereby routing the fluid so as to cause piston 92 to move counterclockwise (FIG. 5). The counterclockwise movement continues until flat 27' of shaft 27 engages tooth 79' of pilot valve 79 causing it to shift to the position seen in FIG. 4. When the pilot valve 79 shifts reversal valve 84 also shifts to the FIG. 4 position causing piston 92 to reverse and to move clockwise. This occurs before the piston 92 engages the stem of sequence valve 75; therefore, the shaft 32 remains extended while the piston 92 oscillates in its running range.

When the lever 87 is manipulated to the parked position seen in FIG. 6 the piston 92 will continue to move in a clockwise direction if it is so moving until the normal reversal takes place, as during the running condition; however, pressurized fluid flow to conduit 89 will be interrupted, ball check valve 91 will close and the chamber 93 will bleed down to exhaust port 53 through the clearance between piston 95 and the walls of the control valve section 78. The left side of reversal valve 84 will be exposed to pressurized fluid; thus the reversal valve will not shift and the piston 92 will continue to move to its parking position beyond the running range engaging the stem of sequence valve 75, causing sequence valve 75 to open. Pressure will then be applied to the portion of auxiliary chamber 40 above piston 41 and the portion of auxiliary chamber below piston 41 will be exhausted in the same manner as it was in the original parked position described above, thereby retracting the piston 41 and shaft 32 subsequent to the parking of piston 92. Thus the wipers will be parked and then the cowl panel will be closed.

It is now apparent that the shaft 32 is moved outwardly when the motor 26 is switched on prior to movement of the main shaft 27 and is moved inwardly when the motor 26 is switched off after the main motor shaft 27 moves to its parked position.

OPERATION

Assuming the apparatus to be in its normal closed position shown in FIG. 2 with pin 72 engaged in the notch 50 of keeper 48, the motor 26 is switched on. This will cause the drive shaft 32 to move outwardly from the cylinder 40, driving the drive lever 34, the keeper 48 and the torsion bar 42 in a counterclockwise direction about the axis of torsion bar 42 as seen in FIG. 2. Since the rod 42 is fixed to the movable hinge 18a, the cowl will lift to a predetermined position sufficient to permit passage of wiper arms 24 and blades 22. The wiper arms 24 and blades 22 will then move out of their depressed parked position and oscillate in their running range until the motor 26 is switched off. When the motor 26 is switched off the arms 24 together with blades 22 will move to their depressed parked position below the cowl panel 14 followed by movement of the shaft 32 into the cylinder 40. As the shaft 32 moves inwardly the drive lever 34 together with keeper 48, rod 42, and cowl panel 14 move clockwise to a closed position. A pressure differential is maintained across the piston 41 in cylinder 40 in both open and closed positions to stabilize the position of the cowl.

Now assuming that the cowl panel 14 is in closed position and it is desired to change the wiper blades, the latch lever 62 is manually operated by lifting on the tab 70 to move the lever 62 clockwise about the axis 64 against the bias of spring 68 with the pin moving in the arcuate slot 74. The pin 72 thus moves out of the notch 50 and the cowl panel 14 can be manually moved counterclockwise to the position shown in FIG. 3 with the pin 72 riding into depression 60 which provides a detent at the extreme open position. Access can now be had to the windshield cleaning apparatus stowed below the cowl panel 14 to permit changing of the blades or arms or to do any work that may be necessary.

If the cowl panel is left in this position, switching on of the motor 26 will cause the drive lever to move the pin 72 along the cam surface 52 down the ramps 58 and 56 until it engages notch 50, at which time the motor will drive the cowl panel to closed position. Alternately the cowl panel 14 can be pushed downwardly, swinging the keeper 48 in a clockwise direction. This causes the pin 72 to ride along the ramp 58 to the ramp 56, past the notch 54, on the cam surface 52 to the notch 50. If a malfunction occurs while the cowl panel 14 is in closed position and it is desired to move the cowl panel 14 to operative position, releasing the pin 72 from the notch 50, and the cowl panel can be moved counterclockwise until the pin 72 engages the notch or detent 54 which is an intermediate detent to retain the cowl panel 14 in its operative position. Likewise, the cowl panel 14 can be manually pushed to the detent 54 from the extreme open position.

Regardless of whether the panel is retained open or closed, operation of the motor will cause the pin 72 to ride along the cam surface 52 to engage the notch 50.

Unique apparatus has been provided for concealing retractable mechanism under a hinged panel which utilizes a single motor for actuation of the hinged panel and the apparatus sequentially. It employs a readily releasable coupling between the motor output shaft and the hinged panel. The readily releasable coupling permits manual opening and closing of the cowl panel 14 in addition to the motorized operation. It includes an intermediate detent position for operation in case of malfunction. Although the concealing mechanism is illustrated and described for use with a concealed windshield wiping mechanism it will of course be understood that in accordance with the broader aspects of the invention the mechanism may be used with other and different types of apparatus where opening or closing of a panel and sequential operation of enclosed or concealed apparatus may be required.

Although a specific embodiment of the invention has been shown and described for the purpose of illustration it will of course be understood that in its broadest aspects various modifications and other embodiments are possible within the scope of the invention. It is to be understood, therefore, that the invention is not limited to the specific element shown but in its broadest aspects it includes all equivalent embodiments and modifications which come within the scope of the invention.

What is claimed is:

1. In a windshield wiping system for motor vehicles including an oscillatable wiper, a movable cowl panel hingedly secured to a body portion of a vehicle for pivotal movement on a longitudinal axis between a first limit position for concealing said wiper when parked and a second limit position; the combination comprising a motor having a first drive shaft and a second drive shaft, transmission means for operatively connecting said first drive shaft to said wiper, releasable coupling means for operatively connecting said second drive shaft to said cowl panel and manually actuatable means for releasing said coupling means whereby said panel can be moved either manually or by said motor means.

2. A combination according to claim 1 wherein said first drive shaft is oscillatable and said second drive shaft is linearly reprocable.

3. A combination according to claim 2 wherein said first and second output shafts are sequentially movable, said motor including means for causing said second drive shaft to move to an extended position to cause said cowl panel to move to open position when said motor is started but only before said first drive shaft causes said wiper to leave its parked position, means for retaining said second drive shaft in extended position during running of said wiper and means for retracting said second drive shaft to cause said cowl panel to move to closed position only subsequent to said wiper returning to parked position.

4. A combination according to claim 1 wherein said releasable coupling means includes a rod fixed to said panel having its axis coincident with said longitudinal axis, a keeper fixed to said shaft for rotation therewith, a drive lever disposed adjacent said keeper and having one end thereof pivotally secured to said rod, the free end of said second drive shaft being pivotally secured to the other end of said drive lever, said manually actuatable means comprising disengageable clutch means for effecting engagement between said drive lever and said keeper to cause conjoint movement thereof, whereby said panel can be moved and retained in position by said motor when said clutch means is engaged and is manually movable when said clutch means is disengaged.

5. A combination according to claim 4 wherein said clutch means comprises a manually actuatable lever pivotally secured to said drive lever having a pin extending therefrom, said drive lever and said keeper each having slots therein, said pin extending through said slot in said drive lever and engageable with said slot in said keeper, said manually actuated lever being pivotable from a position where said pin engages said slot in said keeper to a position where said pin is disengaged from said slot in said keeper.

6. A combination according to claim 5 wherein said manually actuatable lever is spring biased to cause said pin to engage said slot in said keeper, when said slot in said keeper is in alignment with said slot in said drive lever.

7. A combination according to claim 5 wherein said coupling means includes a first detent position for retaining said panel in an open position intermediate its limit positions when said panel is manually moved thereto.

8. A combination according to claim 5 wherein said keeper includes a cam surface extending from the slot therein including a second detent position for engagement with said pin when said panel is manually moved to one of said limit positions.

9. A combination according to claim 8 wherein said manually actuatable lever is spring biased to cause said pin to ride on said cam surface.

10. A combination according to claim 9 wherein said cam surface includes a first ramp extending from said second detent position to cause said pin to be movable to engage the slot in said keeper when said drive lever is actuated by said motor following manual movement to said one limit position.

11. A combination according to claim 10 wherein said cam surface includes a second ramp extending from said first ramp whereby said panel can be manually moved from said one limit position of said panel to the other limit position of said panel and into engagement with said slot in said keeper.

12. In a windshield wiper system for a motor vehicle having an oscillatable wiper arm and blade combination and a compartment for housing said arm and blade combination, a closure panel for said compartment secured for pivotal movement on a longitudinal axis between a first limit position and a second limit position; the combination comprising a shaft fixed to said panel having its axis coincident with said longitudinal axis, a keeper fixed to said shaft for rotation therewith, a drive lever disposed adjacent said keeper and having one end thereof pivotally secured to said shaft, a motor having a linearly reciprocable output shaft, the free end of said output shaft being pivotally secured to the other end of said drive lever and disengageable clutch means for effecting engagement between said drive lever and said keeper to cause conjoint movement thereof, whereby said panel can be moved by the output of said motor when said clutch means is engaged and manually when said clutch means is disengaged.

References Cited

UNITED STATES PATENTS

| | | | |
|---|---|---|---|
| 2,206,822 | 7/1940 | Rousseau | 15—250.16 |
| 2,759,214 | 8/1956 | Madunich | 15—250.16 |
| 3,121,902 | 2/1964 | Massoll | 15—250.17 |

PETER FELDMAN, Primary Examiner

U.S. Cl. X.R.

91—281